United States Patent
Beith et al.

(10) Patent No.: US 6,321,098 B1
(45) Date of Patent: Nov. 20, 2001

(54) SYSTEM AND METHOD FOR THE RECORDING AND PROCESSING OF INFORMATION IN A WIRELESS COMMUNICATION DEVICE

(75) Inventors: Scott D. Beith, San Diego; Jason B. Kenagy, Encinitas, both of CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/154,409

(22) Filed: Sep. 15, 1998

(51) Int. Cl.[7] ............................... H04Q 7/20; H04Q 7/32
(52) U.S. Cl. ........................ 455/564; 455/550; 455/66; 455/344; 455/418; 455/419; 379/260; 379/263; 379/280; 379/200; 379/355.01; 379/355.02
(58) Field of Search ..................................... 455/564, 550, 455/418, 419, 412, 403, 422, 445, 344; 379/260, 263, 280, 284, 199, 200, 355, 356, 355.02, 66

(56) References Cited

U.S. PATENT DOCUMENTS

| | | | |
|---|---|---|---|
| 5,220,594 | * | 6/1993 | Ohnishi et al. ................ 455/412 |
| 5,423,060 | | 6/1995 | Masuda et al. ................ 455/54.1 |
| 5,559,890 | * | 9/1996 | Mizikovsky ................... 455/564 |

FOREIGN PATENT DOCUMENTS 0 841 792 A2    5/1998  (EP) .
0 858 202 A2    8/1998  (EP) .

OTHER PUBLICATIONS

Gin, Chan Huan, "Serial Download of Phone Numbers for Hand Phone." Motorola Technical Developments, vol. 32, pp. 122–123, XP–000741156 (Sep., 1997).

* cited by examiner

Primary Examiner—William Trost
Assistant Examiner—Keith Ferguson
(74) Attorney, Agent, or Firm—Philip R. Wadsworth; Charles D. Brown; Georges C. Pappas

(57) ABSTRACT

A wireless communication device provides streamlined access to recording functions that allow a user to readily record information from a called directory information service provider or other predetermined number. Directory service provider numbers and other predetermined numbers are stored in the system and compared with a user selected destination telephone number. If a match is detected, the system display automatically enables a recording function or prompts the user to manually activate the recording function to permit the user to manually record information obtained from the directory information service provider. Alternatively, the information may be automatically transferred directly into the system without user intervention through a communication link using a formatted data exchange. The system includes options for editing the recorded information, permanently storing the recorded information, and completing a call to the telephone number provided by the service.

32 Claims, 4 Drawing Sheets

SYSTEM AND METHOD FOR THE RECORDING AND PROCESSING OF INFORMATION IN A WIRELESS COMMUNICATION DEVICE

FIELD OF THE INVENTION

The present invention is directed generally to wireless communication devices, and, more specifically, to a system and method to facilitate the recording and processing of information in a wireless communication device.

BACKGROUND OF THE INVENTION

Directory assistance is a service provided by telephone companies to supplement telephone books. Customers call into the directory assistance service to get desired telephone numbers. Often, the customers write the telephone numbers down and then dial them. While the directory assistance service telephone number may be easy to remember, customers frequently find themselves in a situation where they do not have pad or pencil to write the desired telephone number down. The customer attempt at memorizing the desired telephone number as it is repeated to them by directory assistance oftentimes fails when they attempt to dial the desired telephone number.

Therefore, it can be appreciated that there is a significant need for a system that simplifies reporting and processing of data in a wireless communication device. The present invention solves this problem and provides other related advantages.

SUMMARY OF THE INVENTION

The present invention is directed to a technique that simplifies activation of a recording function in a wireless communication device. In an exemplary embodiment, the system includes a storage area to store data, including a set of predetermined numbers. The system also includes a user input device which may be a touchscreen or other device such as a keypad having a plurality of keys that are selectively activated by a user. The user input device senses user operation thereof to enter data, including a first telephone number. A comparator compares the first telephone number with the set of numbers stored in the storage area. In one embodiment, a processor performs the function of the comparator and sets a match indicator when the first telephone number matches one of the set of numbers in the storage area. An alphanumeric recorder is activated in response to a first condition, including the match indicator being set, to permit entry of data into a recorder data storage area.

In one embodiment, the first condition includes the system activating the recorder in response to user activation of the input device in a predetermined manner. The first condition may include the issuance by an output device of a user prompt indicating that the recorder can be activated by the user. In this embodiment, the system activates the recorder in response to user activation of the input device in a predetermined manner following the issue of the prompt.

The system may further include a transceiver to communicate with a communication device remote from the system. The transceiver initially establishes a call to the remote communication device associated with the first telephone number in response to the selection of the first telephone number wherein the data entered into the recorder data storage area is data received from the remote communication device. In one embodiment, the data received from the remote communication device may be manually entered via the user input device. Alternatively, the transceiver may automatically receive data from the remote communication device during the call thereto and store the received data in the recorder data storage area without additional activation of the user input device. In a further embodiment, the data received from the remote communication device comprises a second telephone number and the transceiver further initiates the establishment of a call to a remote communication device associated with the second telephone number. The transceiver may initiate establishment of a call to the remote communication device associated with the second telephone number in response to the user input device sensing user operation thereof to select call option to the second telephone number.

The system further permits editing of data stored in the data storage area using the user input device. For example, the processor may edit the data to include pauses and DTMF signals to the data stored in the recorder data storage area.

In one embodiment, the set of numbers stored in the storage area contains telephone numbers of directory assistance service providers. The set of numbers stored in the storage area may be preprogrammed or manually entered using the user input device.

DETAILED DESCRIPTION OF THE PREFERRED EMBODIMENTS

Figure 1:
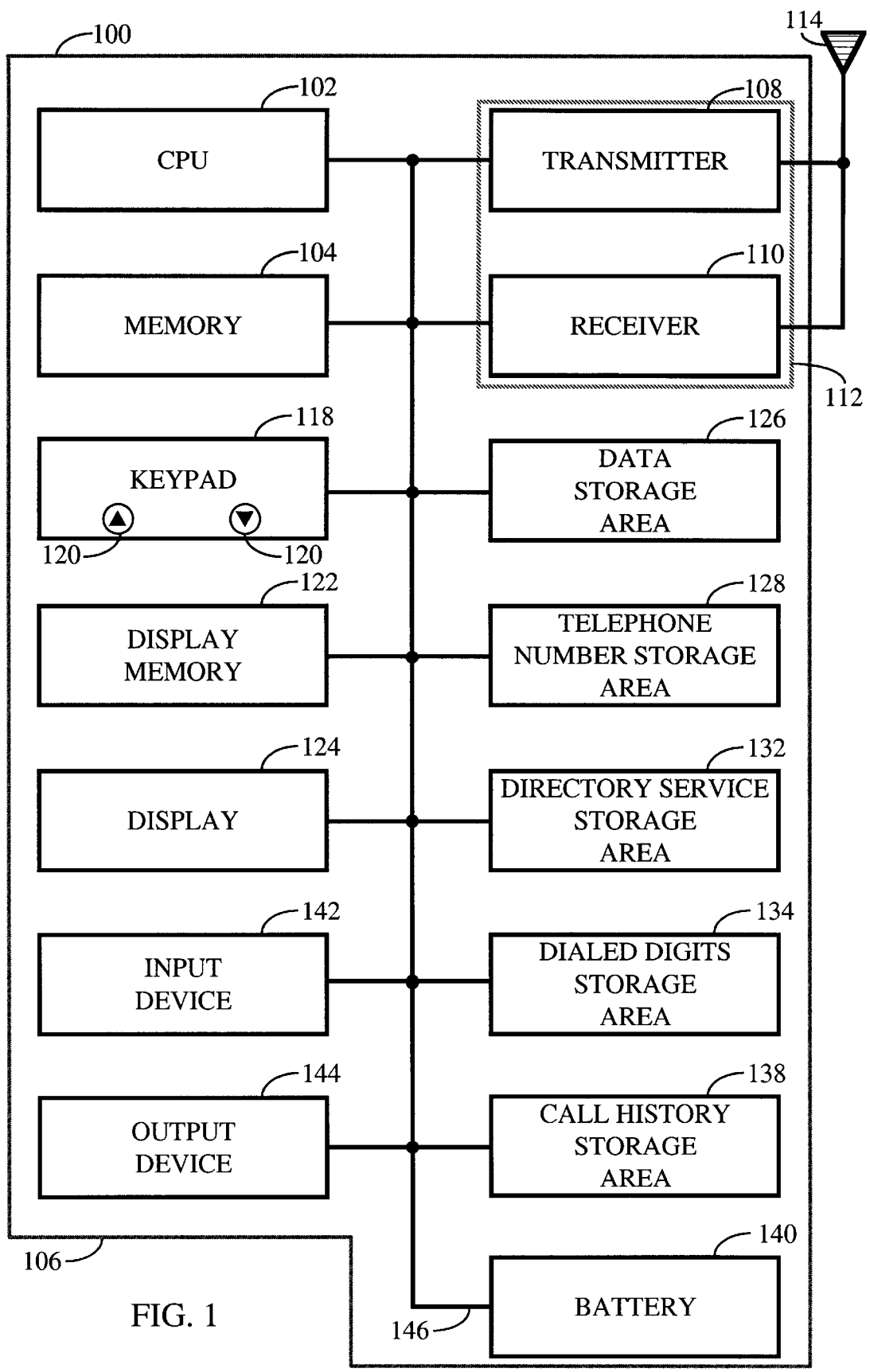
FIG. 1 is a functional block diagram of the wireless communication device of the present invention.

The present invention is directed to a technique for automatically enabling a "scratch pad" function in a wireless communication device when calling directory assistance, or other predetermined destination telephone numbers. As will be described in detail below, such a system advantageously allows the user to temporarily store data received from a remote location via the wireless communication device. As shown in the drawings for the purposes of illustration, the present invention is embodied in a system and method for the automatic activation of a recording function of a telephone and processing information entered using the recording function.

The present invention is embodied in a system 100 illustrated in the functional block diagram of FIG. 1. The system 100 includes a central processing unit (CPU) 102, which controls operation of the system. A memory 104, which may include both read-only memory (ROM) and random access memory (RAM), provides instructions and data to the CPU 102. A portion of the memory 104 may also include non-volatile random access memory.

The system 100, which is typically embodied in a wireless communication device such as a cellular telephone, also includes a housing 106 that contains a transmitter 108 and a receiver 110 to allow transmission and reception of data, such as audio communications, between the system 100 and a remote location, such as a cell site controller (not shown). The transmitter 108 and receiver 110 may be combined into a transceiver 112. An antenna 114 is mechanically coupled to the housing 106 and electrically coupled to the transceiver 112. The operation of the transmitter 108, receiver 110, and antenna 114 is well known in the art and need not be described herein.

A keypad 118 is attached to the housing 106 for operation by the user in a conventional manner. As will be described below, the keypad 118 provides a convenient input device by which destination telephone numbers may be entered by the user. The keypad 118 also includes one or more scroll buttons 120 that allow the user to select displayed options.

The system 100 also includes a display memory 122 and a display 124. The display memory 122 contains data representing one or more alphanumeric symbols or graphic images to be displayed on the display 124. The display memory 122 may be a portion of the memory 104 or may be a separate storage area. The display 124 may be any known form of display. In an exemplary embodiment, the display 124 is a liquid crystal display designed to display four lines of alphanumeric characters with each line having a display capacity of twelve characters.

The present invention is directed to the automatic activation of a scratch pad data entry or data recording function. A data storage area 126 is used to store alphanumeric data for the system 100. When the recording function is enabled, data that is manually entered by the user may be conveniently stored in the data storage area 126. Alternatively, the system 100 accommodates the automatic downloading of data from a remote location, such as directory assistance. The downloaded data is also stored in the data storage area 126. Data that is entered while the recording function is operational is typically stored on a temporary basis only while the recording function is enabled or while power is on to the system. However, as will be described below, the system 100 provides the user with options for saving the data for subsequent use.

The user-entered data, such as desired destination telephone numbers, are typically entered into the system 100 using the keypad 118 and are stored in a data storage area 126. While illustrated as a conventional memory, it can be appreciated by those skilled in the art that the data storage area 126 can be any form of a data structure.

A typical wireless communication device includes a telephone number storage area 128, which is sometimes referred to as a "phone book." The user manually enters destination telephone numbers, and associated names, in the telephone number storage area 128. At a subsequent time, the user may quickly dial the desired destination telephone number by simply selecting the desired location within the telephone number storage area 128. Techniques used to enter data in the telephone number storage area 128 and used to extract numbers from the telephone number storage area are well known in the art, and will not be described in greater detail herein. The telephone number storage area 128 may be included in the non-volatile memory portion of the memory 104 or may be a separate storage area. As can be appreciated by those skilled in the art, the telephone number storage area 128 may be any suitable data structure.

Another storage area of system 100 is a directory service storage area 132, which contains telephone numbers for directory service providers for various areas of the country and world. The telephone numbers found in the directory service storage area 132 can either be pre-programmed at the time of manufacture of system 100 or can be later entered or removed by "over-the-air" techniques or by a user with the use of the keypad 118 or by other suitable means. The telephone numbers stored in the directory service storage area 132 are used in system 100 to automatically activate the recording function described in detail below.

The system 100 also includes a dialed digits storage area 134 to temporarily store the destination telephone number. As used herein, the term "destination telephone number" refers to the telephone number of a communication device with which the user of the system 100 wishes to communicate. The destination telephone number need not be another wireless communication device, but may be any telecommunication device, such as a cellular telephone, personal communications system (PCS) device, wireless local loop, a fixed location telephone, or the like. For example, the user may wish to call his/her office. In this situation, the telephone number associated with the user's workplace would be considered the destination telephone number. Similarly, the user may wish to call an individual having a cellular telephone. In this situation, the mobile identification number (MIN) associated with the individual's cellular telephone would be considered the destination telephone number. The dialed digits storage area 134 receives data manually entered by the user via the keypad 118 or automatically provided in response to the user's selection of an entry in the telephone number storage area 128. In another embodiment described below, the system 100 automatically passes a telephone number received from a remote source to the dialed digits storage area 134. In operation, the transmitter 108 transmits the data in the dialed digits storage area 134 to initiate a telephone call to the destination telephone whose telephone number is stored in the dialed digits storage area.

A call history storage area 138 stores a predetermined number of previously dialed destination telephone numbers. For example, the call history storage area 138 may store the destination telephone numbers from the last ten phone calls. The data in the dialed digits storage area 134 is transferred to the call history storage area 138 when a telephone call is initiated. The call history storage area 138 is conveniently used to recall previously dialed telephone numbers. The use of the call history storage area 138 in conjunction with the recording function of the present invention will be discussed in greater detail below.

The various components described above are powered by a battery 140. In an exemplary embodiment, the battery 140 is a rechargeable battery. Alternatively, the system 100 may be powered by an external source, such as an AC adapter (not shown), an automobile power supply adapter (not shown), or the like. In further embodiments, the battery 140 supplies power to the various components in different operational modes. In one mode, the battery 140 supplies power to all components to enable all functions of the system 100. In another mode, such as a standby mode, the battery 140 supplies power only to selected components to provide power only for certain functions, such as sensing user activation of the keypad 118, or for those functions which are associated with a maintenance function, such as maintaining the data storage area 126, the telephone number storage area 128, the directory service storage area 132, and the like.

The system 100 also includes an input device 142, such as a microphone, and an output device 144 in addition to the display 124. In an exemplary embodiment, the output device 144 is a speaker which produces audible sounds. The input device 142 and output device 144 may be used in a conventional manner to permit two-way audio communication between the wireless communication device and a remote location. In other embodiments the output device 144 can produce other output that can be sensed by another of the physical senses such as vibration. The various components of the system 100 are coupled together by a bus system 146, which may include a power bus, control signal bus, and status signal bus in addition to a data bus. However, for the sake of clarity, the various buses are illustrated in FIG. 1 as the bus system 146.

The operation of the system 100 may now be explained in greater detail. The system 100 differs from the conventional wireless communication device in that the telephone numbers stored in the directory service storage area 132 are compared with any telephone number entered into the dialed digits storage area 134. If a match occurs, the CPU 102 automatically initiates the recording function, which allows the user to record telephone information received from a directory service.

The telephone numbers stored in the directory service storage area 132 can include, for example, 411, 555-1212, and 1-XXX-555-1212 where XXX can be any area code, including 800 and 888. In addition, the recording function may be automatically enabled for other selected telephone numbers, such as, by way of example, emergency numbers (e.g., 911) to allow the user to record vital information. The system 100 can also store numbers which access internal directory assistance, for instance, in a large corporation or other directory assistance telephone numbers. Thus, the system 100 may be readily utilized in any situation where the user contemplates having to enter data using the recording function. Therefore, the present invention is not limited by the specific numbers stored in the directory service storage area 132.

In a representative call to directory assistance, a user enters the directory assistance number via the keypad 118. The CPU 102 stores these entered numbers in the dialed digits storage area 134 for temporary storage. The CPU 102 then compares the telephone number temporarily stored in the dialed digits storage area 134 to all telephone numbers that are stored in the directory service storage area 132.

The present invention can use a single CPU 102 or can use a collection of individual units which replace certain functions of the CPU 102. The collection of units can include a processor for receiving and storing input into the dialed digits storage area 134 and a comparator for comparing an input number in the dialed digits storage area with a stored set of numbers. However, the CPU 102 may be conveniently used to perform the functions of storing data in the dialed digits storage area 134 and comparing the number in the dialed digits storage area with the stored set of numbers in the directory service storage area 132.

If the CPU 102 determines that there are no telephone numbers in the directory service storage area 132 that match the telephone number temporarily stored in the dialed digits storage area 134, the system 100 proceeds to process the call through the transmitter 108 to the destination telephone having the destination telephone number in the dialed digits storage area 134.

If the CPU 102 determines that there is a telephone number in the directory service storage area 132 that matches the telephone number temporarily stored in the dialed digits storage area 134, a match signal is generated.

Figure 2A:
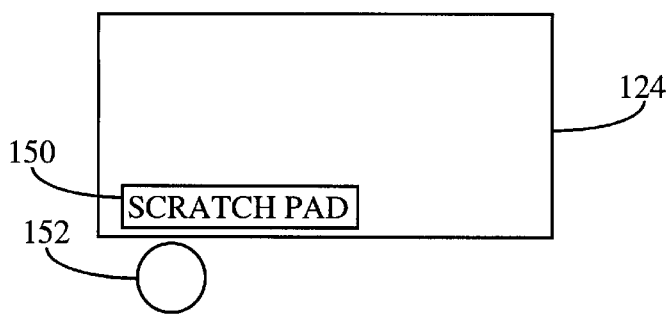
FIGS. 2A, 2B, 2C, and 2D are examples of the display used by the system of FIG. 1 to display alphanumeric text and graphic images.

As a result of the generation of the match signal, the CPU 102 automatically enables the recording function. The recording function can be a scratch pad, notepad, or other form of known electronic recording. In an exemplary embodiment, the recording function may be automatically enabled as soon as the transmitter 108 transmits the digits in the dialed digits storage area 134, or may be delayed until an actual communication link is established between the wireless communication device and the telephone associated with the destination telephone number in the dialed digits storage area. Alternatively, the system 100 can set up the recording function and require user activation thereof. In this embodiment, the display 124 displays an indicator, query, prompt, or other message to indicate that the recording function can be activated by the user. This recording function can be a scratch pad, notepad, or other known form of electronic recording. The indicator of the display 124 indicator can be a display message 150, as depicted in FIG. 2A. The indicator can also take other forms such as LEDs, other types of displays, other shapes or symbols displayed on the display 124, or other indicators well known in the art.

Figure 2B:
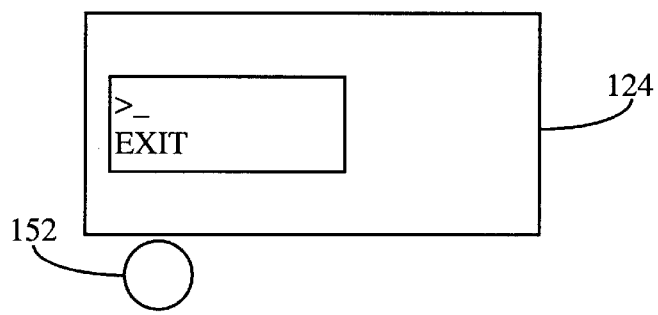

In this embodiment, the user activates the recording function by selectively activating a control button 152 located in proximity with the display message 150 displayed in the display 124 of FIG. 2A. In response to the activation of the control button 152, the CPU 102 activates the recording function and sends a signal to the display 124 causing a notepad or scratch pad to appear in the display with a flashing text prompt, as depicted in FIG. 2B. An "Exit" prompt shown in FIG. 2B allows the user to terminate the recording function at any time.

In operation, the user selects the desired destination telephone number (e.g., the directory assistance number) using the keypad 118 or by selecting a directory assistance number from the telephone number storage area 128. The destination telephone number is temporarily stored in the dialed digits storage area 134 and transferred to the transmitter 108 to connect the call to the directory assistance service. Upon connection to the directory assistance service, which can be human or machine, and upon receiving the desired telephone number from the directory assistance service, the user can enter the desired telephone number into the data storage area 126 using the keypad 118.

Figure 2C:
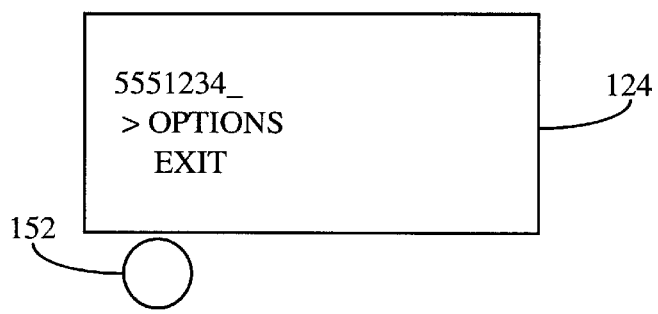

Once the desired telephone number is entered in the data storage area 126, the CPU 102 sends a signal to the display 124 to change the display to that illustrated in FIG. 2C, which includes the desired number, an "Options" prompt, and an "Exit" prompt. The display 124 can also include additional elements, such as the display of various options or commands available to the user. The user can operate the scroll buttons 120 (see FIG. 1) to highlight the desired command and activate the desired command using the control button 152. For example, the user may select the Options command by operating the scroll buttons 120 to highlight the Options prompt and activating the control button 152.

Figure 2D:
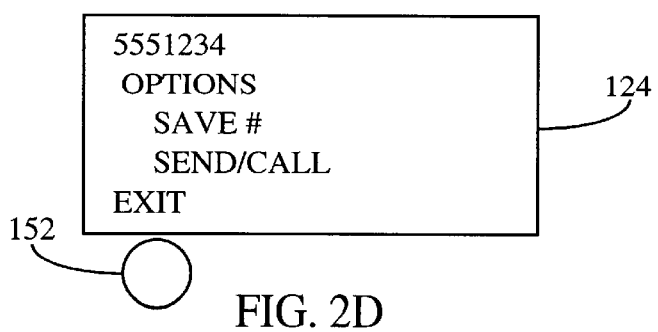

If the user selects the Options prompt through use of the scroll buttons 120 and the control button 152 on the keypad 118, the CPU 102 sends another signal to display 124 to display the available options, as illustrated in FIG. 2D. The display 124 can optionally display the desired telephone number and also the Exit prompt. As illustrated in FIG. 2D, the options available to the user include an option to save the desired number and the option to call the desired telephone number.

The user may activate a "Save" option by operating the scroll buttons 120 (see FIG. 1) to highlight the Save option prompt on the display 124 and activating the control button 152. If the user selects the Save option, the CPU 102 copies the desired telephone number, which is temporarily stored in the data storage area 126 and transfers the data to the telephone number storage area 128. The user can edit the desired telephone number in any desired fashion using conventional editing techniques. For example, the user may wish to add an area code to the desired telephone number received from the directory assistance service. In addition, the user can add a description to the desired telephone number. For example, the user may wish to obtain information about current movies playing at local theaters. The directory assistance service provides the desired telephone number. As described above, the user may enter the desired telephone number in the data storage area 126 using the keypad 118. The user may subsequently save the desired telephone number in the telephone number storage area 128 using the Save option described above. The user may also add a description (e.g., Movie Theaters) using conventional text entry techniques. The desired telephone number and associated description are stored in the telephone number storage area 128 for later use.

The user may also establish a telephone communication link with the desired telephone number by selecting a "Send/Call" option. The user can select the Call option by using the scroll buttons 120 to highlight the Call option prompt on the display 124 and activating the control button 152. If the user selects the Call option, the CPU 102 can immediately transfer the desired telephone number from the data storage area 126 to the dialed digits storage area 134. The number in the dialed digits storage area 134 is transferred to the transmitter 108 to establish a telephone communication link with the destination telephone number. The process of transmitting the destination telephone number and establishing a telephone communication link are well known in the art, and need not be described herein. The CPU 102 can optionally wait for the user to depress a "Send" key (not shown) on the keypad 118 if the wireless communication device uses the Send key to initiate the call placement.

Connection to the directory assistance service can also be done in a telephone conferencing mode, which allows for an additional party to listen in on the call to the directory service provider. The additional party requires a separate communication device to connect to the system 100 via a separate call. In a typical operation, the system 100 initially establishes a telephone connection with the additional party and, during the course of the call with the additional party, places the call to the directory service provider thus allowing the additional party to also receive the directory service information through conferencing feature.

Figure 3A:
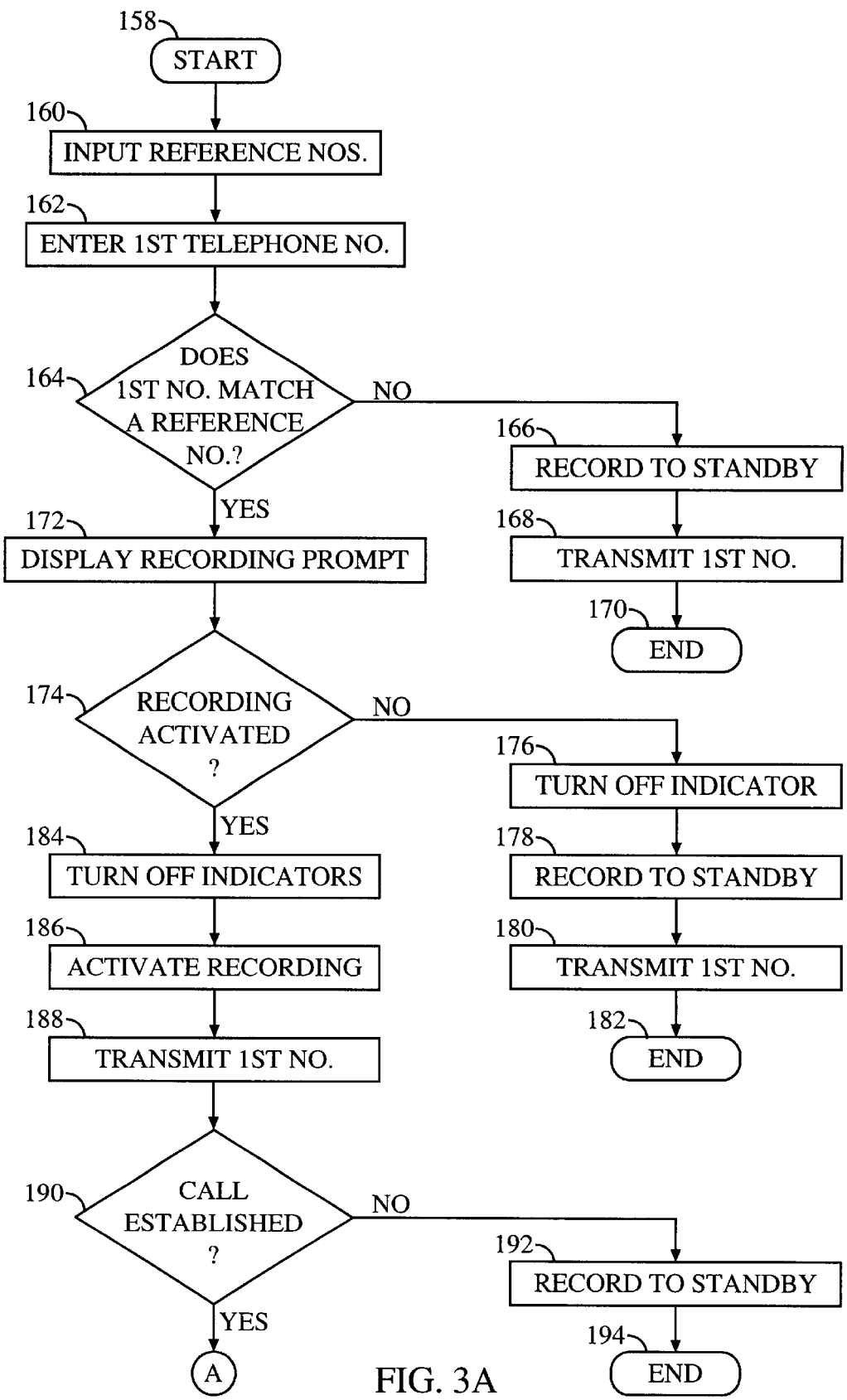
FIGS. 3A and 3B are flowcharts illustrating the operation of the system of FIG. 1 to record and process information.
Figure 3B:
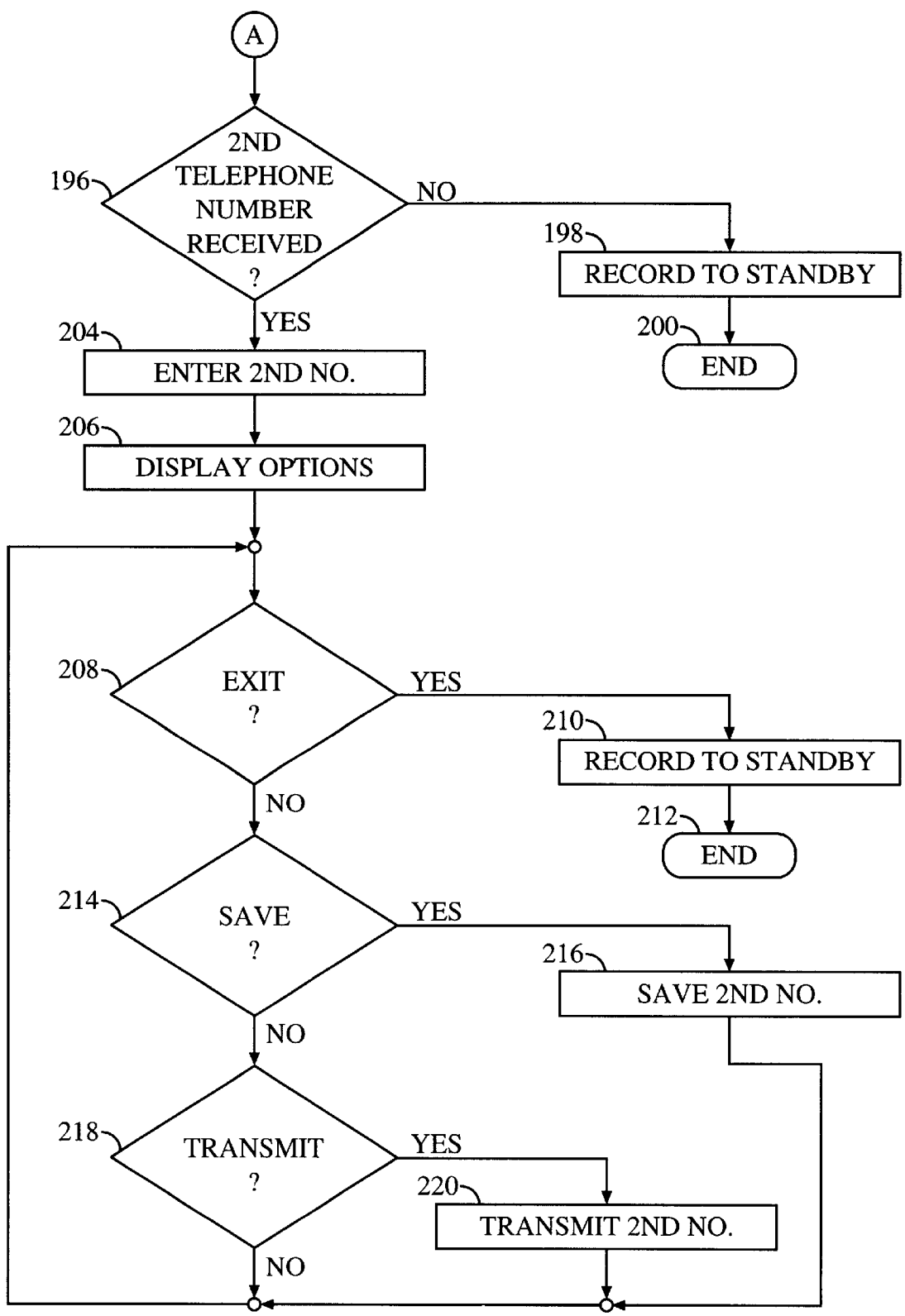

The operation of the system 100 is illustrated in the flowcharts of FIGS. 3A and 3B which illustrate a case of calling a directory service provider and subsequently recording a second telephone number and placing a call to the second telephone number, as may be done in a typical implementation of system 100. The system 100 starts at step 158 and moves to step 160 where telephone numbers used for directory assistance are stored in the directory service storage area 132. As previously discussed, step 160 of storing directory assistance numbers, or other reference numbers, can be done at time of manufacture or by the user at some time prior to calling a directory service. In step 162, the user inputs the first destination telephone number, which is, by way of example, a telephone number of a directory assistance service. As previously discussed, the user may enter the first telephone number manually using the keypad 118 (see FIG. 1) or automatically by selecting the first telephone number from the telephone number storage area 128. The first destination telephone number is then transferred to the dialed digits storage area 134.

In decision 164, a determination is made whether the first destination telephone number, temporarily stored in the dialed digits storage area 134 (see FIG. 1), matches any of the telephone numbers in the directory service storage area 132. If there is no match, the result of decision 164 is NO and in step 166 the system 100 sets the recording function to a standby mode. In step 168 the transmitter 108 initiates a call to the first destination telephone number in a conventional manner and the system 100 ends processing at step 170.

If there is a match between the first destination telephone number, temporarily stored in the dialed digits storage area 134, and one of the telephone numbers in the directory service storage area 132, the result of decision 164 is YES. In that event, the system 100 moves to step 172 where an indicator or message is shown on the display 124 to indicate that the recording function has been activated. Alternatively, the system 100 may display an indicator or message that requires response from a user as to whether the recording function should be activated. This message is shown on the display 124, as illustrated in FIG. 2A.

In decision 174, the system 100 senses user activation, by way of example, of the control button 152 to activate the recording function. If the user does not activate the recording function, the result of decision 174 is NO. In that event, the system 100 moves to step 176 where the indicator or message on the display 124 is turned off. In step 178, the recording function is set to the standby mode. In step 178, a call is placed through the transmitter 108 to the telephone associated with the first destination telephone number in a conventional manner and the system 100 ends processing at step 172.

If the system 100 automatically activates the recording function upon detection of a match between the destination telephone number stored in the dialed digits storage area 134 (see FIG. 1) and any of the telephone numbers in the directory service storage area 132, or if the user activates, by way of example, the control button 152 to manually activate the recording function, the indicator or message is turned off in step 184. In step 186, the recording function is activated. As described above, this may include the display of a prompt on the display 124, such as a flashing data entry prompt, and may further include the Exit prompt. In step 178, the data in the dialed digits storage area 134 is transferred to the transmitter 108 and transmitted to a remote location (e.g., a cell site controller) to establish a wireless communication link with the telephone device associated with the destination telephone number (e.g., a directory assistance service).

In decision 190, the system determines whether call establishment with the first destination telephone number was successful. If call establishment was not successful, the result of decision 190 is NO and, in step 192 the system 100 sets the recording function to the standby mode and the process ends in step 194.

If the call to the first destination telephone number results in the successful establishment of a communication link with the telephone associated with the first destination telephone number, then the result of decision 190 is YES. In that event, in decision 196, shown in FIG. 3B, the system 100 determines whether the desired second destination telephone number was successfully received from the directory assistance service. If the second destination telephone number is automatically received by system 100, then successful receipt of the second destination telephone number is based on the satisfactory reception of data from a remote location (e.g., the cell site controller) that forms part of the communication link with the telephone associated with the first destination telephone number (e.g., the directory assistance service). If the user must manually intervene to enter the second destination telephone number into the data storage area 126 using the keypad 118, the system 100 can determine whether or not the second destination telephone number has been successfully received based on user activity of the keypad, and elapsed time between the establishment of the communication link with the first destination telephone number and the entry of data into the data storage area 126. For example, if a predetermined period of time expires and the user has not entered any data using the keypad 118, the system 100 may assume that the second destination telephone number has not been successfully received, or that the user no longer wishes to enter the second destination telephone number into the data storage area 126.

In one embodiment described above, the user hears the second destination telephone number and manually enters the second destination telephone number in the data storage area 126 (see FIG. 1) using the keypad 118. In this embodiment, the output device 144, such as a speaker, permits the user to hear the second destination telephone number being announced by the directory assistance service provider. In this embodiment, the user manually operates the keypad 118 to enter the second destination telephone number into the data storage area 126 in a conventional manner.

Alternatively, the directory assistance service provider may transmit data indicative of the second destination telephone number. For example, the directory assistance service provider may transmit the second destination telephone number in the form of dual-tone multi-frequency (DTMF) tones that may be readily interpreted by the system 100 to generate the second destination telephone number. The use of DTMF tones for telephone numbers is well known in the art, and need not be described in greater detail herein. In this embodiment, the system 100 may automatically decode the DTMF tones to generate data indicative of the second destination telephone number and store the second destination telephone number in the data storage area 126.

In yet another embodiment, the second destination telephone number may be transmitted in other forms, such as a data packet using a format well known in the field. For example, a short message service (SMS) message includes provision for a callback destination telephone number. The system 100 can implement data formats of this type to automatically detect the second destination telephone number transmitted from the directory assistance service provider and received by the system 100. It should be noted that other formats may also be successfully used by the system. Accordingly, the present invention is not limited by the specific format used to automatically transmit data related to the second destination telephone number.

If the second destination telephone number was not successfully received, the result of decision 196 is NO. In that event, in step 198, the system 100 sets the recording function to the standby mode and ends the processing in step 200. If the second destination telephone number was successfully received, the result of decision 196 is YES. In that event, in step 204, the system detects entry of the second destination telephone number. As noted above, the second destination telephone number may be manually entered by the user via the keypad 118, or automatically detected by the system 100 and stored in the data storage area 126.

In step 206, the system 100 displays one or more options on the display 124 (see FIG. 1). At this point, the display 124 has an appearance similar to that illustrated in FIG. 2D. As discussed above, the user has the option of saving the second destination telephone number, calling the second destination telephone number, or exiting the recording function. These options are reflected by the next three decision steps.

In decision 208, the system 100 determines whether the user has selected the Exit option. As discussed above, one technique for selecting options requires the manipulation of the scroll buttons 120 to position a cursor, or other indicator, on the desired option and activating, by way of example, the control button 152. If the user has selected the Exit option, the result of decision 208 is YES. In that event, in step 210, the system 100 sets the recording function to the standby mode and ends the processing at step 212. If the user has not selected the Exit option, the result of decision 208 is NO. In that event, the system 100 moves to decision 214 to determine whether the user has selected the Save option. If the user has selected the Save option, the result of decision 214 is YES. In that event, in step 216, the system 100 saves the second destination telephone number, temporarily stored in the data storage area 126, by copying the second destination telephone number to the telephone number storage area 128. Following the execution of step 216, the system 100 returns to decision 208 to determine whether the user has selected the Exit option.

Returning again to decision 214, if the user has not selected the Save option, the result of decision 214 is NO. In that event, the system 100 moves to decision 218 to determine whether the user has selected the Transmit or Send option. If the user has selected the Transmit option, the result of decision 218 is YES. In that event, in step 220 the system 100 transfers the second destination telephone number to the dialed digits storage area 134 (see FIG. 1) and processes the call in a conventional manner. As discussed above, this includes using the transmitter 108 to transmit the second destination telephone number, now stored in the dialed digits storage area 134, to a remote location, such as a cell site controller (not shown). If the user has selected the Transmit option, the call is processed in a conventional manner, which need not be described in greater detail herein. If the user has not selected the Transmit option, the result of decision 218 is NO. In that event, or following the execution of step 220, the system 100 returns to decision 208 to determine whether the user has selected the Exit option.

Although not explicitly illustrated in FIG. 3B, the system 100 may include additional options to edit the second destination telephone number prior to storage in the telephone number storage area 128 (see FIG. 1). This may include adding a description of the destination telephone number, adding other data, such as area code, pauses, and DTMF tones, or linking the second destination telephone number to other numbers stored in the telephone number storage area 128. The linked data may include, by way of example, calling card codes or data related to the parties associated with telephone number. Other options include storing the second destination telephone number in the call history storage area 138 to permit convenient redialing of the second destination telephone number in the near future.

Thus, the system 100 readily provides readily accessible recording, editing, and transmitting features to greatly assist the user in obtaining and using information provided by called directory assistance service providers.

It will be appreciated that, although a specific embodiment of the invention has been described herein for purposes of illustration, various modifications may be made without departing from the spirit and scope of the invention. Accordingly, the invention is not limited except as by the appended claims.

What is claimed is:

1. A system for recording and processing telephone numbers in a wireless communication device, the system comprising:

11 a housing;

a storage area to store alphanumeric data including a set of predetermined telephone numbers;

a user input device supported by the housing and sensing user operation to enter data, including a first telephone number;

a comparator to compare the first telephone number with the set of predetermined telephone numbers stored in the storage area and setting a match indicator when the first telephone number matches one of the set of predetermined telephone numbers in the storage area;

a transceiver within the housing to communicate with a communication device remote from the system, the transceiver initiating establishment of a call to the remote communication device associated with the first telephone number in response to the selection of the first telephone number; and an alphanumeric recorder activated in response to the match indicator being set, to permit entry of data received from the remote communication device into a recorder data storage area.

2. The system of claim 1 wherein the user input device senses user activation thereof during the call to the remote communication device and the alphanumeric recorder stores the data manually entered via the user input device in the recorder data storage area.

3. The system of claim 1 wherein the transceiver automatically receives data from the remote communication device and stores the received data in the recorder data storage area without additional activation of the user input device.

4. The system of claim 1, further including a processor for editing the data in the recorder data storage area.

5. The system of claim 1, further including a nonvolatile data storage area and a processor to copy data from the data recorder storage area to the nonvolatile data storage area.

6. The system of claim 5 wherein the data in the data recorder storage area is indicative of a second telephone number and the nonvolatile data storage area is a phone book storage area.

7. The system of claim 1 wherein the data received from the remote communication device is indicative of a second telephone number.

8. The system of claim 7 wherein the transceiver further initiates establishment of a call to a remote communication device associated with the second telephone number in response to the selection of a call option to the second telephone number.

9. A system for recording and processing telephone numbers in a wireless communication device, the system comprising:

a storage area to store data, including a set of predetermined numbers;

a user input device having a plurality of keys that can be selectively activated by a user, the user input device sensing user operation of selected keys to enter data, including a first telephone number;

a processor comparing the first telephone number with the set of numbers stored in the storage area and setting a match indicator when the first telephone number matches one of the set of numbers in the storage area; and an alphanumeric recorder activated in response to a first condition, including the match indicator being set, to permit entry of data into a recorder data storage area.

10. The system of claim 9 wherein the first condition further includes the system activating the recorder in response to user activation of the input device in a predetermined manner.

11. The system of claim 9, further including an output device wherein the first condition further includes the output device issuing a user prompt that the recorder can be activated by the user, the system activating the recorder in response to user activation of the input device in a predetermined manner following the issue of the user prompt.

12. The system of claim 9 wherein the set of numbers stored in the storage area contains telephone numbers of directory assistance service providers.

13. The system of claim 9, further including a display and a call history storage area, the display displaying a second telephone number recorded by the recorder and a user prompt to store the second telephone number in the call history storage area, the call history storage area storing the second telephone number in response to user activation of the input device in a predetermined manner following the display of the user prompt.

14. The system of claim 9, further including a display and a phone book storage area wherein the display displays a second telephone number recorded by the recorder and a prompt indicating that the second telephone number can be stored in the phone book storage area, the directory storage storing the second telephone number in response to user activation of the input device in a predetermined manner following the display of the user prompt.

15. The system of claim 9, further including a transceiver to communicate with a communication device remote from the system, the transceiver initiating establishment of a call to the remote communication device associated with the first telephone number in response to the selection of the first telephone number wherein data entered into the recorder data storage area is data received from the remote communication device.

16. The system of claim 15 wherein the user input device senses user activation thereof during the call to the remote communication device and the alphanumeric recorder stores the data manually entered via the user input device in the recorder data storage area.

17. The system of claim 15 wherein the transceiver automatically receives data from the remote communication device during the call to the remote communication device and stores the received data in the recorder data storage area without additional activation of the user input device.

18. The system of claim 15 wherein the data received from the remote communication device comprises a second telephone number and the transceiver further initiates establishment of a call to a remote communication device associated with the second telephone number.

19. The system of claim 15 wherein the data received from the remote communication device comprises a second telephone number and the transceiver initiates establishment of a call to a remote communication device associated with the second telephone number in response to the user input device sensing user operation thereof to select a call option to the second telephone number.

20. The system of claim 9 wherein the processor permits editing of data stored in the recorder data storage area using the user input device.

21. The system of claim 20 wherein the processor editing includes adding pauses and DTMF signals to the data stored in the recorder data storage area.

22. The system of claim 9 wherein the set of numbers stored in the storage area are pre-programmed.

23. The system of claim 9 wherein the set of numbers stored in the storage area are manually entered by the user input device.

24. A method for recording and processing telephone numbers in a wireless communication device, the method comprising the steps of:

receiving a first telephone number selected by a user;

comparing the first telephone number with a set of predetermined numbers and setting a match indicator when the first telephone number matches one of the set of predetermined numbers; and activating a data recording function in response to the match indicator being set, the data recording function recording data received via the wireless communication device.

25. The method of claim 24, further including the step of establishing a communication link with a remote communication device associated with the first telephone number in response to the receipt of the first telephone number, the data being recorded by the data recording function being data received from the remote communication device.

26. The method of claim 24 for use with a communication device having a user input device wherein the data recording function is activated in response to user activation of the input device in a predetermined manner.

27. The method of claim 24 for use with a communication device having a user input device and an output device, the method further including the step of issuing a user prompt that the data record function can be activated by the user, the data record function being activated in response to user activation of the input device in a predetermined manner.

28. The method of claim 24 wherein the set of numbers stored in the storage area contains telephone numbers of directory assistance service providers and the step of comparing compares the first telephone number with a set of telephone numbers of directory assistance service providers.

29. The method of claim 24, further including the steps of communicating with a remote communication device associated with the first telephone number and receiving a second telephone number therefrom, sensing user selection of an operation to save the second telephone number in a storage area, and storing the second telephone number in the storage area in response to sensing user selection of the operation to save the second telephone number.

30. The method of claim 24 for use with a wireless communication device having a display, the method further including the steps of communicating with a remote communication device associated with the first telephone number and receiving a second telephone number therefrom, displaying the second telephone number recorded by the recorder, displaying a prompt indicating that the second telephone number can be stored in a storage area, sensing user selection of an operation to save the second telephone number in the storage area, and storing the second telephone number in the storage area in response to sensing user selection of the operation to save the second telephone number.

31. The method of claim 24 for use with a wireless communication device having a user input device, further including the steps of communicating with a remote communication device associated with the first telephone number and receiving data therefrom, sensing user activation of the user input device during the call to the remote communication device, and recording the data by sensing user activation of the user input device.

32. The method of claim 24 for use with a wireless communication device having a user input device wherein the step of receiving the first telephone number senses user activation of the user input device to select the first telephone number, the method further including the steps of communicating with a remote communication device associated with the first telephone number and receiving data therefrom, and automatically recording the data without additional user activation of the user input device.

* * * * *